Patented Nov. 23, 1948

2,454,547

UNITED STATES PATENT OFFICE

2,454,547
POLYMERIC QUATERNARY AMMONIUM SALTS

Louis H. Bock, Huntingdon Valley, Pa., and Alva L. Houk, San Luis Obispo, Calif., assignors to Rohm & Haas Company, Philadelphia, Pa., a corporation of Delaware No Drawing. Application October 15, 1946, Serial No. 703,290

6 Claims. (Cl. 260—567.6)

This invention relates to polymeric, surface-active, quaternary ammonium salts and to a method of preparing same. More specifically, this invention relates to salts having the general formula

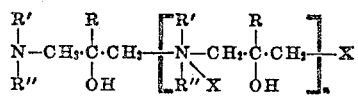

in which R' in both occurrences represents a methyl or ethyl group, R" in both occurrences represents an aliphatic or araliphatic hydrocarbon or ether group of eight to eighteen carbon atoms, as will be described in greater detail later, R in both occurrences represents a hydrogen or a methyl group, n is an integer having a value of one to nineteen and, preferably, from three to eleven, and X is a chlorine or bromine atom.

The products of this invention are prepared by reacting under heat a secondary amine having the general formula R'—NH—R", in which R' and R" have the above significance, and an epihalohydrin having the formula

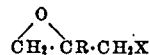

in which X is chlorine or bromine and R is a hydrogen or methyl group. The reaction is one involving addition and polymerization and is believed to take the course exemplified by the following:

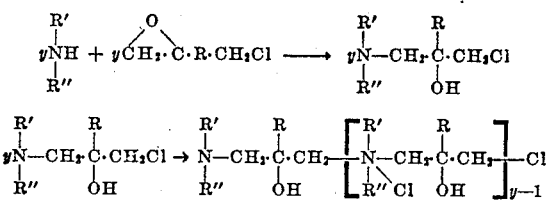

In the preferred process, the reactants are dissolved in a solvent such as benzene or toluene and the solution is heated. Heating to refluxing temperature is recommended. While a wide range of temperatures may be employed, it is preferred that temperatures from about 90° C. to about 150° C. be used to insure efficiency. As the reaction advances, a quaternary ammonium salt is formed. Since the halogen atom attached to the pentavalent nitrogen atom of this salt is ionizable, the progress of the addition reaction may be followed by a titration of this halogen ion. Also, as the reaction continues, polymerization takes place, the molecular weight of the product increases, an increasing number of groups having the structure

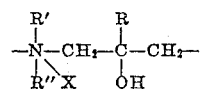

become joined in each molecule, and the value of n in the general formula above increases. The progress of the polymerization may be determined by measurements of the molecular weight, for example, by the boiling-point method in which benzene is the solvent.

The simplest product of this invention is the polymeric quaternary ammonium salt represented by the general formula above in which n has the value of one. This may be considered a dimer. It has been found, however, that the more highly polymerized products, that is, those in which n has a value of three or more, have a greater substantivity for cellulosic fibers and are, therefore, preferred. As the degree of polymerization increases, the salts become much more satisfactory for use as protective colloids in emulsification operations. The uppermost degree of polymerization is reached when n has a value of nineteen. If an effort is made to polymerize the product beyond the point where n represents nineteen, decomposition occurs and the yield and quality of the product are impaired. For particularly satisfactory results, it is preferred to stop the reaction, by cooling, when the value of n has reached eleven.

Thus, in summary, the products of this invention are those represented by the general formula above in which n has a value of one to nineteen and, preferably, from three to eleven. The molecules of such products contain, therefore, two to twenty and, preferably, four to twelve combined molecules of both the secondary amine and epihalohydrin.

Compounds may be prepared having the above general formula in which n is one particular absolute value. This, however, is not necessary because, on the basis of utility, a product in which n represents an average value is quite as satisfactory as a single polymer in which n is the same number but represents an absolute value. In the commercial preparation of the products of this invention, a mixture of polymers is ordinarily obtained and such mixtures are eminently suited as surface-active compounds, provided the average value of $n$ as measured by the average molecular weight is within the range of one to nineteen and, preferably, within the range of three to eleven.

The secondary amine

employed in preparing the new compounds herein disclosed, may vary somewhat in composition but is limited in that the substituent R' may be only a methyl or an ethyl group and the number of carbon atoms in the substituent R" must total eight to eighteen. This requirement regarding R" is critical and necessary in order to impart surface-active properties to the final product. Thus, R" may be (a) a straight or branched chain alkyl group such as n-octyl, 2-ethyl hexyl, diisobutyl, decyl, undecyl, dodecyl, cetyl, n-octadecyl, isooctadecyl groups, or the like. The products made from amines in which R" represents various isomeric forms of an alkyl group differ only to a negligible extent. R" may be (b) an aralkyl group such as phenylethyl, tolylamyl, phenyl-tert.-butyl, butylbenzyl, ethylbenzyl, octylbenzyl, and the like, or (c) an aliphatic group in which the chain of carbon atoms is interrupted at intervals of at least two and, preferably, two to four carbon atoms by an ether-oxygen atom, exemplified by butoxy-ethoxy-ethoxy-ethyl, butoxy-butoxy-butyl, butoxy-propoxy-propyl, octoxy-ethyl, hexoxy-butyl, et cetera. Or R" may b (d) an arylaliphatic group, the acyclic chain of carbon atoms of which is interrupted at intervals of at least two and, preferably, two to four carbon atoms by an ether-oxygen atom, typified by phenoxy-ethoxy-ethyl, phenoxy-propoxy-propyl, phenoxy-butoxy-ethyl, tolyloxy-butoxy, ethyl, tolyloxy-ethoxy-ethoxy-ethyl, p-butylphenoxy-ethoxy-ethyl, p-tert.-amylphenoxy-propoxy-propyl, and p-octylphenoxy-ethoxy-ethyl.

The epihalohydrins which may be used are those containing three and four carbon atoms, e. g.,

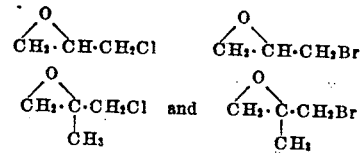

The following examples serve to illustrate this invention:

Example 1

In a three-necked flask equipped with reflux condenser, stirrer, and thermometer, there were mixed 183 parts (one mol) of methyl octadecyl amine, forty parts of benzene, and 92.3 parts (one mol) of an epichlorhydrin having the formula

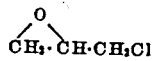

While agitation was maintained, the mixture was held at 95° C. for thirty hours. At this point, a titration of chloride ion indicated a conversion of 82.5%. The product solidified on cooling and was recrystallized from ethyl acetate. It had a melting point of 84°–92° C. and a molecular weight of 2580, as determined in benzene, indicating that the molecules contained 6.5 units of combined amine and epichlorhydrin on the average.

The product was surface-active and exhausted completely on cotton.

Example 2

As in Example 1, a mol each of methyl octadecyl amine and the epichlorhydrin

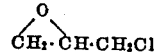

were reacted in benzene solution. The reaction was conducted at 105° C. over a period of twenty-one hours, after which the product was crystalized two times from ethyl acetate. The recrystallized material had a melting point of 80°–87° C. and an average molecular weight in benzene of 3950, indicating that the product was made up of ten units of combined amine and epichlorhydrin on the average.

Example 3

By the procedure of Example 1 a solution of 328 parts (one mol) of p-(1,1,3,3-tetramethylbutyl) phenoxy-ethoxyethyl methyl amine and 92.8 parts (one mol) of epichlorhydrin was stirred at 90° C. for nine and one-half hours. A chloride titration indicated that it was essentially completely reacted. The benzene was removed by vacuum distillation, leaving as a residue a sticky, soft material which gave a slightly turbid solution in water. The average molecular weight was 1790, which corresponds to a product having an average of between four and five units of combined amine and epichlorhydrin per molecule.

Example 4

Following the same procedure as in Example 1, a mixture of 213 parts of ethyl dodecyl amine and 92.8 parts of epichlorhydrin

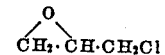

was reacted by being heated at 95° C. for 105 hours. At this point, a chloride determination indicated that 72% of the reactants had reacted. After being recrystallized from ethyl acetate, the product had a molecular weight of 2500, indicating that the average molecule was made up of about eight units of combined amine and epichlorhydrin.

Although in the above examples epichlorhydrin is used, it is to be understood that epibromhydrin is equally useful. The chlorhydrin has an advantage in being cheaper than the corresponding bromhydrin; but, for some purposes, as, for example, the preparation of fungicides, the use of epibromhydrins is preferred.

All of the products of this invention are surface-active and are particularly suitable for use as softening agents for textiles and to prevent bleeding of dyes. They have the desirable property of exhausting completely from solution, especially on cotton. In addition, they have definite value as emulsifying agents and as bactericides and fungicides.

We claim:

1. A surface-active quaternary ammonium salt having the general formula

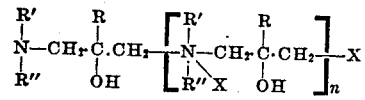

in which $n$ is an integer which has a value of three to eleven, R in both occurrences is the same member of the class consisting of hydrogen and methyl groups, R' in both occurrences is the same alkyl group from the class consisting of methyl and ethyl groups, R'' contains eight to eighteen carbon atoms and in both occurrences is the same hydrocarbon group from the class consisting of alkyl groups and aralkyl groups, and X is a member of the group consisting of chlorine and bromine.

2. A surface-active quaternary ammonium salt having the general formula

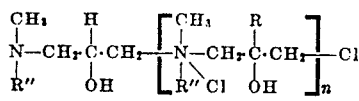

in which $n$ is an integer which has a value of three to eleven, R'' in both occurrences is the same alkyl group of eight to eighteen carbon atoms.

3. A surface-active quaternary ammonium salt having the general formula

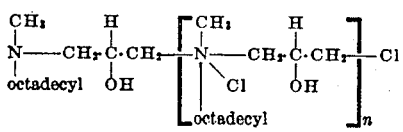

in which $n$ is an integer which has a value of three to eleven.

4. A surface-active quaternary ammonium salt having the general formula

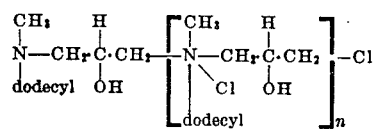

in which $n$ is an integer which has a value of three to eleven.

5. A process for preparing surface-active quaternary ammonium salts which comprises reacting at a temperature from 90° C. to 150° C. equimolar amounts of an epihalohydrin of the general formula

in which R is a member of the class consisting of hydrogen and methyl groups and X is a member of the group consisting of chlorine and bromine, and a secondary amine having the general formula

in which R' is a member of the group consisting of methyl and ethyl groups and R'' contains eight to eighteen carbon atoms and is a hydrocarbon group from the class consisting of alkyl groups and aralkyl groups, and continuing the heating to form said quaternary ammonium salt containing an average of four to twelve combined molecules of both the epihalohydrin and the amine as evidenced by molecular weight determinations.

6. A process for preparing surface-active quaternary ammonium salts which comprises reacting at a temperature from 90° C. to 150° C. equimolar amounts of epichlorohydrin of the formula

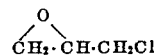

and a secondary amine having the formula

in which R'' is an alkyl group of 8 to 18 carbon atoms, and continuing the heating to form said ammonium salt containing an average of 4 to 12 combined molecules of both the epichlorohydrin and the amine as evidenced by molecular weight determinations.

LOUIS H. BOCK.
ALVA L. HOUK.

REFERENCES CITED

The following references are of record in the file of this patent:

UNITED STATES PATENTS

| Number | Name | Date |
|---|---|---|
| 2,129,264 | Downing et al. | Sept. 6, 1938 |
| 2,143,388 | Schlack | Jan. 10, 1939 |
| 2,180,809 | Kartaschoff | Nov. 21, 1939 |
| 2,185,163 | Ulrich | Dec. 26, 1939 |
| 2,214,352 | Schoeller et al. | Sept. 10, 1940 |
| 2,271,378 | Searle | Jan. 27, 1942 |

FOREIGN PATENTS

| Number | Country | Date |
|---|---|---|
| 790,279 | France | Sept. 2, 1935 |
| 22,339 | Netherlands | Aug. 15, 1930 |